United States Patent [19]

Shiota et al.

[11] Patent Number: 4,951,523
[45] Date of Patent: Aug. 28, 1990

[54] CONTROL CABLE

[75] Inventors: Makoto Shiota, Ikeda; Yukio Tomizawa, Hyogo; Yoshiaki Ohoka, Kobe, all of Japan

[73] Assignees: Nippon Cable System, Takarazuka; Kawasaki Heavy Industries, Ltd., Kobe, both of Japan

[21] Appl. No.: 457,611

[22] Filed: Dec. 27, 1989

[30] Foreign Application Priority Data

Dec. 28, 1988 [JP] Japan .................... 63-335135

[51] Int. Cl.⁵ .............................. F16C 1/10
[52] U.S. Cl. ..................... 74/502.5; 74/502.6
[58] Field of Search ........... 74/502.5, 502.6, 502.4, 74/500.5; 428/368, 398

[56] References Cited

U.S. PATENT DOCUMENTS

| 3,015,969 | 1/1962 | Bratz | 74/502.5 |
|---|---|---|---|
| 3,176,538 | 4/1965 | Hurlow | 74/502.5 |
| 3,177,901 | 4/1965 | Pierce | 74/502.5 |
| 3,190,084 | 6/1965 | Moon et al. | 74/502.5 |
| 3,584,518 | 6/1971 | Hurlow | 74/502.5 |
| 4,099,425 | 7/1978 | Moore | 74/502.5 |
| 4,112,708 | 9/1978 | Fukuda | 74/502.5 |
| 4,193,319 | 3/1980 | Langford | 74/500.5 |
| 4,378,712 | 4/1983 | Yoshifuji | 74/502.5 |
| 4,541,303 | 9/1985 | Kuzunishi | 74/502.5 |

FOREIGN PATENT DOCUMENTS

| 0034150 | 3/1977 | Japan | 74/502.5 |
|---|---|---|---|
| 0003313 | 1/1981 | Japan | 74/502.5 |
| 0137711 | 8/1982 | Japan | 74/502.5 |
| 0121215 | 7/1984 | Japan | 74/502.5 |
| 0069315 | 4/1985 | Japan | 74/502.5 |
| 0228112 | 10/1986 | Japan | 74/502.5 |

Primary Examiner—Vinh T. Luong
Attorney, Agent, or Firm—Armstrong, Nikaido, Marmelstein, Kubovcik & Murray

[57] ABSTRACT

A control cable having an inner cable and a conduit for slidably guiding the inner cable. The inner cable has a core made of twisted wires and a cover provided on the core. The conduit has a tubular liner, a shield layer made of wires closely arranged around the liner, a taping helically wound on the shield layer with remaining a helical gap, a filler member inserted in the gap, and an outer coat provided on the taping and the filler member. The control cable is flexible and soft and has high load efficiency and high stroke efficiency.

4 Claims, 4 Drawing Sheets

CONTROL CABLE

BACKGROUND OF THE INVENTION

The present invention relates to a control cable, and more particularly, to a control cable having noticeable flexibility, load efficiency and stroke efficiency.

In conventional manually operated parking brakes, a rod-link mechanism or a chain transmitting mechanism have been used as a remote control means.

On the other hand, a control cable which has a specified construction shown in FIGS. 5 and 6 has been employed in a special technical field, e.g. for subway vehicles, where saving space and light weight are strongly requested.

The control cable shown in FIGS. 5 and 6 is a so-called ball-bearing-type control cable. The control cable comprises a flat belt-like center race 21 with concave grooves extending in the longitudinal direction, a number of steel balls 22 arranged with the same intervals at the upper and lower sides of the center race 21, retainers for keeping intervals of the balls 22, a spiral tube 25 surrounding the outer races 24 and an outer coat 26, etc. In this type of control cable, the center race 21 is a movable member, and the balls 22 and the retainers 23 move also by a half stroke of the center race 21 in order to reduce the frictional resistance.

The above-described conventional ball-bearing-type control cable has problems that the use is limited. That is to say, it is difficult to arrange the control cable in three-dimensional form or in a twisted arrangement, and is low in flexibility, since the shape of the center race 21 as a movable member is flat. And the stroke of the inner race is restricted, since a space for allowing the linear motion of the retainers is required.

For example, when the control cable is arranged in a three-dimensional form or U-shaped form, the balls tend to be biased to one-side as the center race reciprocally slides, since resistances of the balls are different from each other between the upper and lower sides with respect to the center race 21. Therefore, there is a risk that the effect of ball-bearing (rolling contact) will finally disappear, and gallings will happen in the center race 21 and the balls 22, and then, operation becomes down.

The object of the present invention is to provide a control cable having a slidable inner cable and a conduit and having the same load efficiency (rare (%) of an output force W obtained from the other end of a cable to an input force F applied to an end of the cable) and the same stroke efficiency (rate (%) of an output stroke of the other end of the cable to an input operation stroke (including stroke loss)) as the above-mentioned ball-bearing-type of control cable, and further, which can be easily arranged in three-dimensional form.

SUMMARY OF THE INVENTION

The control cable of the present invention comprises an inner cable and a conduit. The inner cable has a core made of twisted plural wires and a cover provided on the core. The conduit has a tubular liner, a shield layer made of plural wires arranged around the liner, a taping herically wound around the shield layer with a helical gap, a filler member filling the gap of the taping and an outer coat layer provided on the taping and the filler.

The cover of the inner cable is generally made of composition of thermoplastic resin, for example, polyamide, polyester, polyacetal, preferably polyhexamethylene adipamide (Nylon 66).

The liner of the conduit is also generally made of composition of thermoplastic resin, for example, polyester, polyamide, polyacetal, preferably polybutylene terephthalate (PBT).

In PBT of the material of the liner, whiskers of potassium titanate are preferably included in order to increase the endurance by raising surface-hardness and thermal metamorphosis point. When the ratio of whiskers is not larger than 1% by weight, the endurance is almost the same as material with no whisker. If the ratio of whiskers is not less than 30% by weight, the endurance is not increased in proportion to the blend ratio, and flexibility decreases remarkably. Therefore, preferable range of the blending ratio is from 1 to 30% by weight.

Organic filler such as aramide fibers can be added in the material instead of the inorganic filler such as the whiskers of potassium titanate.

In comparison with the conventional ball-bearing-type control cable, the control cable of the present invention is remarkably flexible, and can be easily arranged in various shapes. Further, in the control cable of the present invention, the load efficiency is almost the same as the conventional ball-bearing-type control cable, and the stroke efficiency is better than the conventional cable.

That is to say, in the present invention, the shield layer is flexible since the shield layer is made of plural wires, and the taping prevents a birdcage-like deformation of the shield layer due to axial compression load applied on the shield layer. In addition, the filler member makes the unevenness of the taping even without reducing flexibility, and eliminates disadvantages due to the unevenness.

The above-mentioned characteristics such as a load efficiency and a stroke efficiency are preferably progressed by using Nylon 66 for a cover of the inner cable and by using PBT resin composition for a liner.

Though the reason of the progress is not clear, the reason is assumed that the Nylon 66 resin composition has high flexibility and high anti-abration characteristic under high load, and therefore, when PBT resin composition is used as the material of liner, a special mutual function of their physical properties causes a remarkable reduction of frictional abration between the inner cable and the liner.

As described above, the control cable of the present invention has remarkable flexibility in comparison with the conventional ball-bearing-type control cable, and the load efficiency and stroke efficiency are almost the same as the ball-bearing-type control cable. Therefore, a total control system using the control cable of the present invention can be easily produced and assembled. Further maintenance work of the system is easy.

Hereinafter, a preferable embodiment of the above-mentioned control cable will be described in detail with reference to the accompanying drawings.

DETAILED DESCRIPTION

Figure 1:
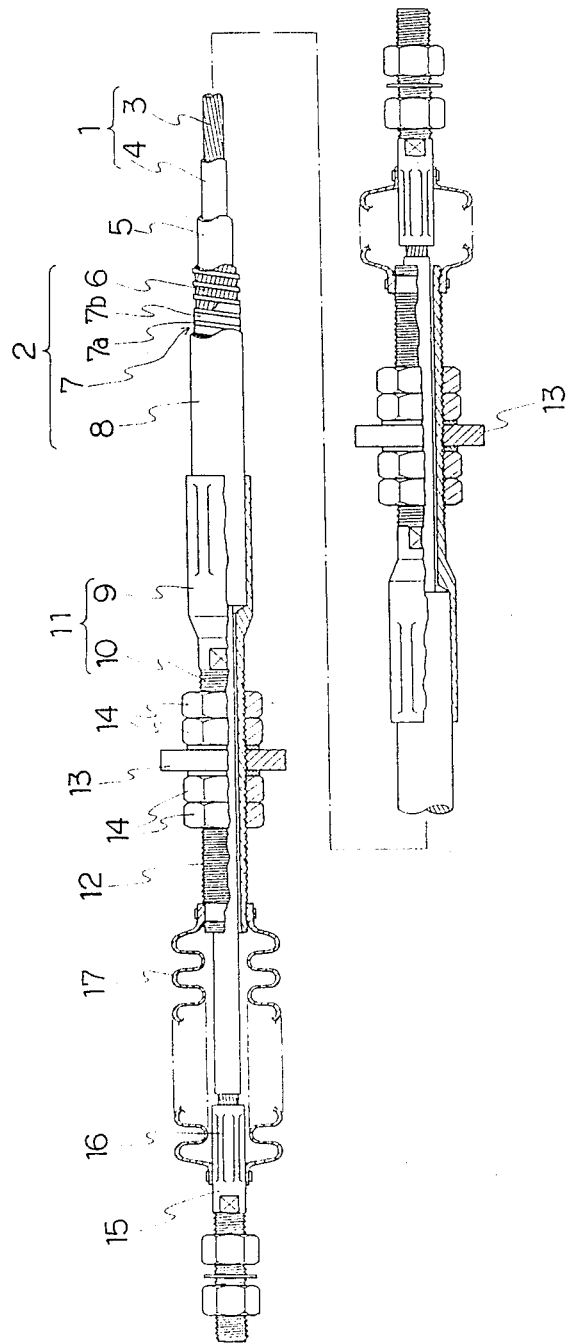
FIG. 1 is a partially cutaway front view showing an embodiment of the control cable of the present invention.

In FIG. 1, the reference numeral 1 designates an inner cable, and the numeral 2 designates a conduit.

Figure 2:
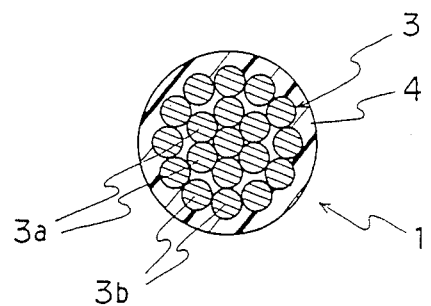
FIG. 2 and FIG. 3 are enlarged sectional views showing the inner cable and the conduit of FIG. 1, respectively.

The inner cable 1 has a core 3 made of twisted plural steel wires 3a as shown in FIG. 2. The core 3 of the embodiment shown in FIG. 2 consists of a center strand portion made of twisted seven steel wires 3a and an outer portion comprising twelve steel wires 3b helically wound around the center portion in the same or opposite direction as the center portion.

The core 3 has a cover 4 provided on the outside thereof as described in detail later.

The conduit 2 comprises a tubular liner 5, a shield layer 6 made of a number of steel wires helically wound around the liner 5, a taping 7 made of a steel tape (7a in FIG. 1) helically wound on the shield layer with remaining a helical gap, a filler member 7b helically wound on the shield layer 6 so as to fill the space between adjacent rolls of the taping 7, and an outer coat 8 made of synthetic resin arranged on the taping 7 and the filler member 7b.

The cover 4 can be made of various types of polyamide, polyester, polyacetal, a composition of those resins including rubber to obtain high shock resistance grade, or a composition of those resins in which a little lubricant, lubricating oil, plasticizer, flame retarder or the like. However, a composition of Nylon 66 resin is preferably used, since Nylon 66 has good flexibility, good slide property under high load, and good durability.

The inner cable 1 having the above-mentioned construction can be smoothly operated and has good flexibility even if the control cable is curved in any direction. For example, an inner cable of about 5 mm in outer diameter can be repeatedly used with 100 mm in radius of curvature, and an inner cable of about 15 mm in outer diameter can be repeatedly used with 300 mm in radius of curvature.

For the above mentioned liner 5 of the conduit 2, a composition including polybutylene terephthalate or polyacetal is most preferably used. The liner 5 is a member to be repeatedly rubbed under high load with a cover 4 coated on a core portion 3 made of steel wires having high hardness. Therefore, high endurance under such hard condition is required to the liner 5. Accordingly, fillers such as fine fibers are preferably blended in the material of the liner. One of the most preferable materials of the liner is a composition of PBT resin including 1 to 30% by weight of whiskers of potassium titanate.

The taping 7 made of a tape 7a herically wound on the shield layer 6 is an element for binding the wires of the shield layer in order to prevent birdcage-like deformation of the shield layer. The birdcage-like deformation means a deformation that wires of the shield layer are curved and gaps are provided between the closely adjacent wires when an axial high load is applied to the inner cable 1. In order to satisfy the requirement, a known steel wire of S10C to S60C in JIS G4051 which is slightly flattened (so as to have an oval cross section) is generally used as a tape 7a.

The above-mentioned filler member 7b inserted in a helical gap of the tape 7a is a flexible and soft string or rope made of a felt, a nonwoven fablic, or the like. The filler member 7b is an element for evenning the teeth-like unevenness due to the taping 7 without reducing the flexibility or the like of the conduit. That is, when an outer coat 8 is directly provided on the outer surface without the filler member 7b, the unevenness of the taping 7 appears to the outer surface as it is. Therefore, when the projecting portions rub with a corner or edge of an object or strike against an object due to vibration of the control cable, and then, those projections tend to be damaged. The above-mentioned filler member can previously delete those problems.

The outer coat 8 is provided as a most outer layer of a conduit 2 in order to protect the shield layer 6, the taping 7 and the filler member 7b from rusting and water permeation. The outer coat 8 can be made of, for example, polyamide, polyetherester, polypropylene, polyethylene, polyvinyl chloride, and the like through known method.

Those conduits constructed as mentioned above has also high flexibility. Then a conduit of 10 mm in diameter can be arranged with about 100 mm in radius of curvature, a conduit of 30 mm in diameter can be arranged with about 300 mm in radius of curvature. The inner cable 1 is coated with lubricant such as silicone grease and is inserted through the conduit 2 to assemble a control cable. In the control cable shown in FIG. 1, the conduit 2 is attached to an object by means of an outer cap 11. The outer cap 11 has a tubular caulking portion 9 to be caulked on an end of the conduit 2 and a cylindrical attaching portion 10 continuously extending from the cauking portion 9. The attaching portion 10 is formed with a male thread 12 and is fixed to a partner member with double nuts 14 from both sides.

The inner cable 1 passes through the above-mentioned attaching portion 10. The end of the inner cable 1 comes out of the attaching portion 10 and is fixed to an end rod 15 to be connected with a movable partner member. A tubular caulked portion 16 of the end rod 15 is directly caulked on the outer surface of a core portion 3 after the cover 4 is stripped. Further, an exposed portion of the inner cable 1 is protected by a boot 17 like a bellows.

Hereinafter, a control cable of the present invention is explained in comparison with a conventional ball-bearing-type control cable through an example and a comparative example.

EXAMPLE:

At first, nineteen wires (each wire is 2 mm in diameter) were twisted, and the strand was coated with a cover of Nylon 66 by using a melting-extruder with a cross-head-die. Thus an inner cable of 12 mm in diameter was obtained.

Figure 3:
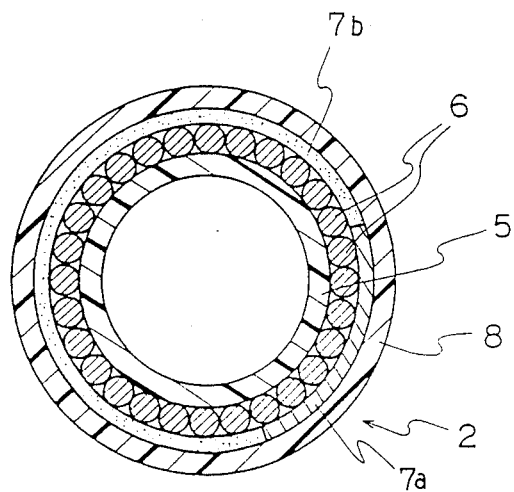

Next, a blend of PBT (polybutylene terephthalate) 90% by weight and whiskers of potassium titanate 10% by weight was extruded to form a tubular liner with outside diameter of 17 mm and inside diameter of 14 mm. Then, as shown in FIG. 3 twenty eight steel wires (each wire has 2 mm diameter) were wound on the liner with slight herical shape to form a shield layer. A steel tape of 2.4 mm in width and 1 mm in thickness was helically wound on the shield layer with remaining a helical gap of 4 mm in width to form a taping. Further, the helical gap was filled with a filler member made of nonwoven fabric of PET (polyethylene terephthalete). Then, an outer coat of polypropylene was applied on them to form a conduit of 26 mm in diameter.

After applying a suitable amount of silicone grease on the inner cable, the inner cable and the conduit were combined to produce a control cable (pull control cable).

Comparison Example

Figure 5:
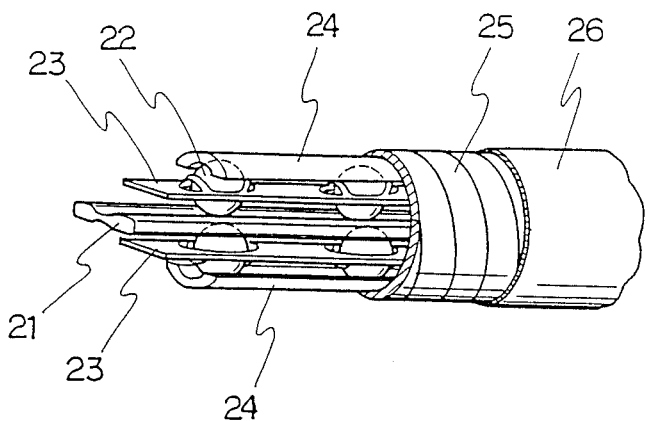
FIGS. 5 and 6 are a partial perspective view and a sectional view showing an example of a conventional control cable.
Figure 6:
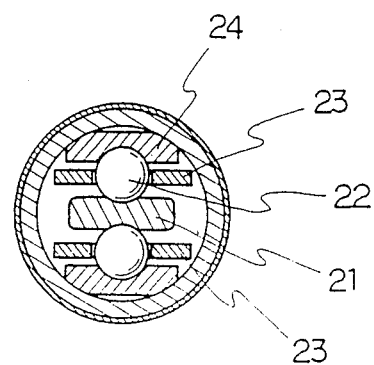

A ball-bearing type of control cable such as shown in FIGS. 5 and 6, power transmission capacity of which was four tons, was employed as a comparative example.

Figure 4:
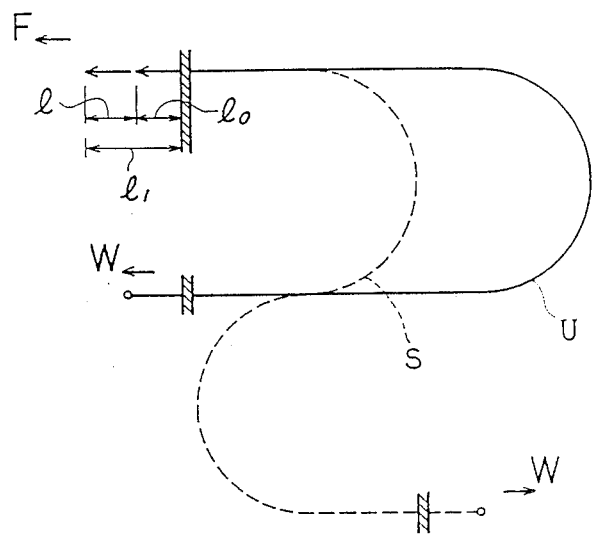
FIG. 4 is a diagram showing a device for measuring efficiencies of control cables.

Each control cable of the example and the comparative example was arranged, as shown in FIG. 4 by full lines U, in a curved (U-shaped) layout with radius of curvature of 300 mm. The load efficiency $\eta w = W/F$ (%) and the stroke efficiency $\eta s$ (%) of the control cables were measured. The character "F" means a pull operational force at the operating side, and "W" means the reaction force at the fixed side.

The stroke efficiency $\eta s$ was calculated by:

$$\eta s = \frac{80}{80 + l} \times 100 \, (\%)$$

where the stroke is 80 mm, and the stroke loss $l$ (in FIG. 4) = $l_1 - l_0$ mm ($l_0$ means the position at F=50 kg (the initial load); and $l_1$ means the position at F=1,200 kg (the maximum load)).

Further, in accordance with general method for testing a control cable, the control cable was arranged in an S-curved layout with 300 mm radius of curvature as shown in FIG. 4 by broken lines, and the above efficiencies were measured and calculated.

The obtained data are shown in Table 1.

TABLE 1

|  | Layout of Cable | Example | Comparative example |
| --- | --- | --- | --- |
| Load efficiency $\eta w$(%) | U | 95.0 | 95.0 |
| (1,200 kg) | S | 91.5 | 91.7 |
| Stroke efficiency $\eta s$(%) | U | 87.6 | 84.4 |
| (1,200 kg × 80 mm) | S | 88.5 | 82.3 |

As shown in Table 1, with respect to the load efficiency, the control cable of Example has the load efficiency similar to that of the Comparative example, and the loss due to friction resistance is the same in the both cases. With respect to the stroke efficiency, the control cable of Example shows a value better than the comparative example.

In the control cable of the present invention, a pre-tension treatment before use is preferably applied in order to previously cause an initial elongation of the inner cable to be generated. That is, a tension force which is about 150 to 300% of a load to be used is applied for 0.2 to 5 hours, and thereafter, the force is removed. By virtue of the pre-tension treatment, the stroke-loss of the control cable is further reduced. For example, when a control cable is used under 0.5 to 1.5 tons in tension load for a parking brake for a railway vehicle, the control cable is preferably treated with pre-tension of generally 1 through 5 tons, preferably about 3 ton, for 2 to 4 hours.

When the pre-tension is applied to the inner cable, the conduit is also subjected to pre-compression of 1 to 5 tons at the same time. Then, permanent deformation which will generate in the conduit is previously released. The load can be continuously or alternately applied in the pre-tension treatment. For example, in the latter case, loading state and unloading state are alternatated.

Though several embodiments of the present invention are described above in detail, it is to be understood that the present invention is not limited to the above-mentioned embodiments, and various changes and modifications may be made in the invention without departing from the spirit and scope thereof.

What we claim is:

1. A control cable, comprising:
   (a) an inner cable having a core made of twisted plural wires and a cover provided on the core, the cover of the inner cable is made of a polyhexamethylene adipamide resin composition; and
   (b) a conduit having a tubular liner made of a polybutylene terephthalate resin composition, a shield layer made of plural wires arranged around the liner, a taping helically wound on the shield layer with remaining a helical gap, a filler member filling the gap of the taping and an outer coat layer provided on the taping and the filler member.

2. The control cable of claim 1, wherein said inner cable is subjected to pre-tension treatment under 150 to 300% of a load to be used; and the conduit is subjected to pre-compression treatment as a reaction of the pre-tension of the inner cable.

3. A control cable, comprising:
   (a) an inner cable having a core made of twisted plural wires and a cover provided on the core; and
   (b) a conduit having a tubular liner made of polybutylene terephthalate resin composition including 1 to 30% by weight of whiskers of potassium titanate, a shield layer made of plural wires arranged around the liner, a taping helically wound on the shield layer with remaining a helical gap, a filler member filling the gap of the taping and an outer coat layer provided on the taping and the filler member.

4. The control cable of claim 1, wherein said inner cable is subjected to pre-tension treatment under 150 to 300% of a load to be used; and the conduit is subjected to pre-compression treatment as a reaction of the pre-tension of the inner cable.

* * * * *